ALL RELAY TELEPHONE SELECTOR SWITCH

Filed Jan. 23, 1946 2 Sheets-Sheet 1

INVENTOR.
WINFRED T POWELL
BY D. Clyde Jones
J. L. Baines
ATTORNEY

ALL RELAY TELEPHONE SELECTOR SWITCH

Filed Jan. 23, 1946

2 Sheets-Sheet 2

INVENTOR.
WINFRED T. POWELL
BY D. Clyde Jones
T. L. Bowes
ATTORNEY

Patented June 27, 1950 2,513,048

UNITED STATES PATENT OFFICE 2,513,048

ALL RELAY TELEPHONE SELECTOR SWITCH

Winfred T. Powell, Rochester, N. Y., assignor to Stromberg-Carlson Company, a corporation of New York Application January 23, 1946, Serial No. 642,917

9 Claims. (Cl. 179—18)

This invention relates to automatic telephone systems and more particularly to a selector arrangement for selecting links or trunks in such systems.

The purpose of the invention is to provide a novel relay type selector which is directively controlled to select a desired group from several groups of links accessible at said selector and which thereafter operates automatically to hunt for an idle link in the selected group.

Figure 1:
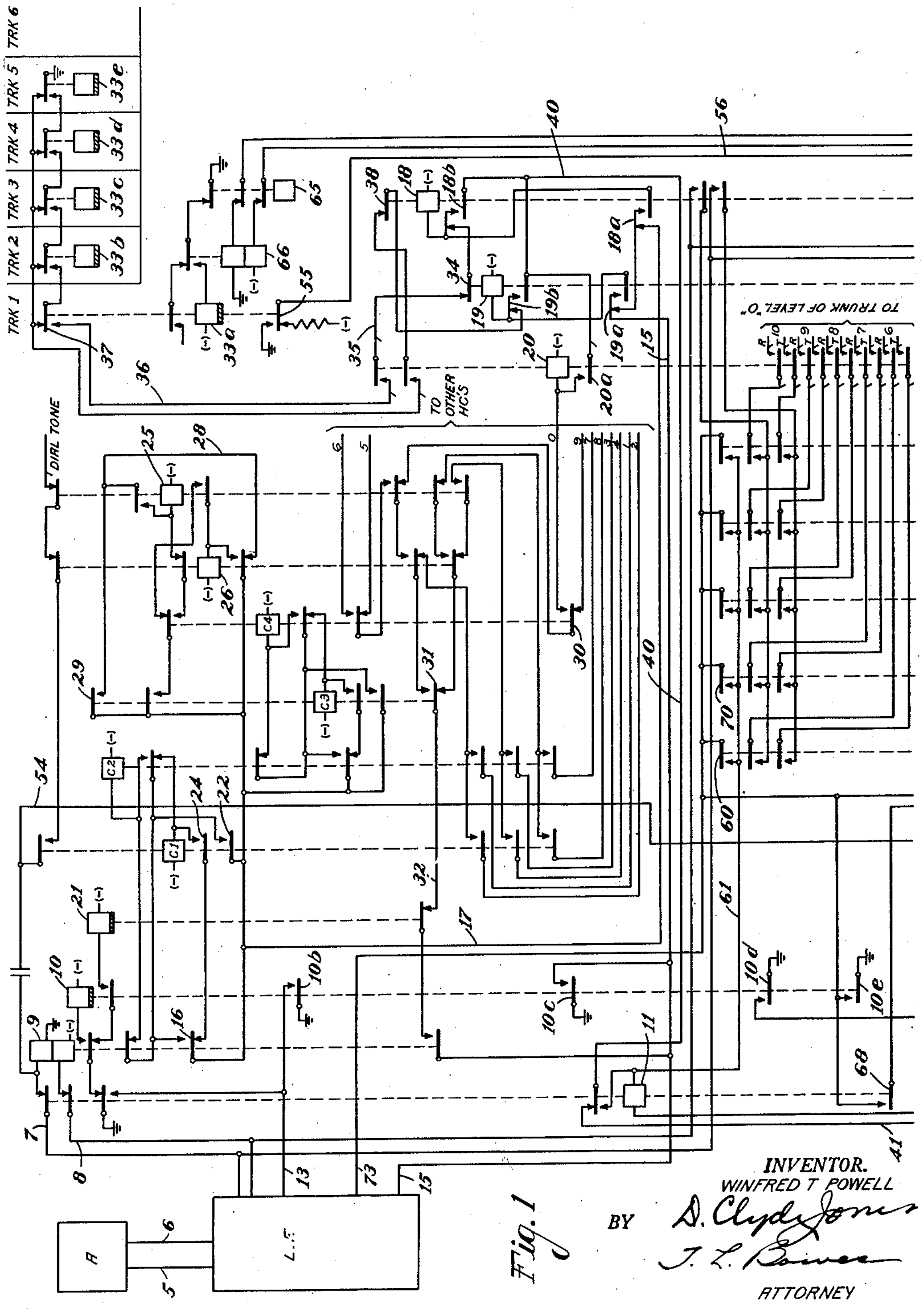
Figures 2, 3:
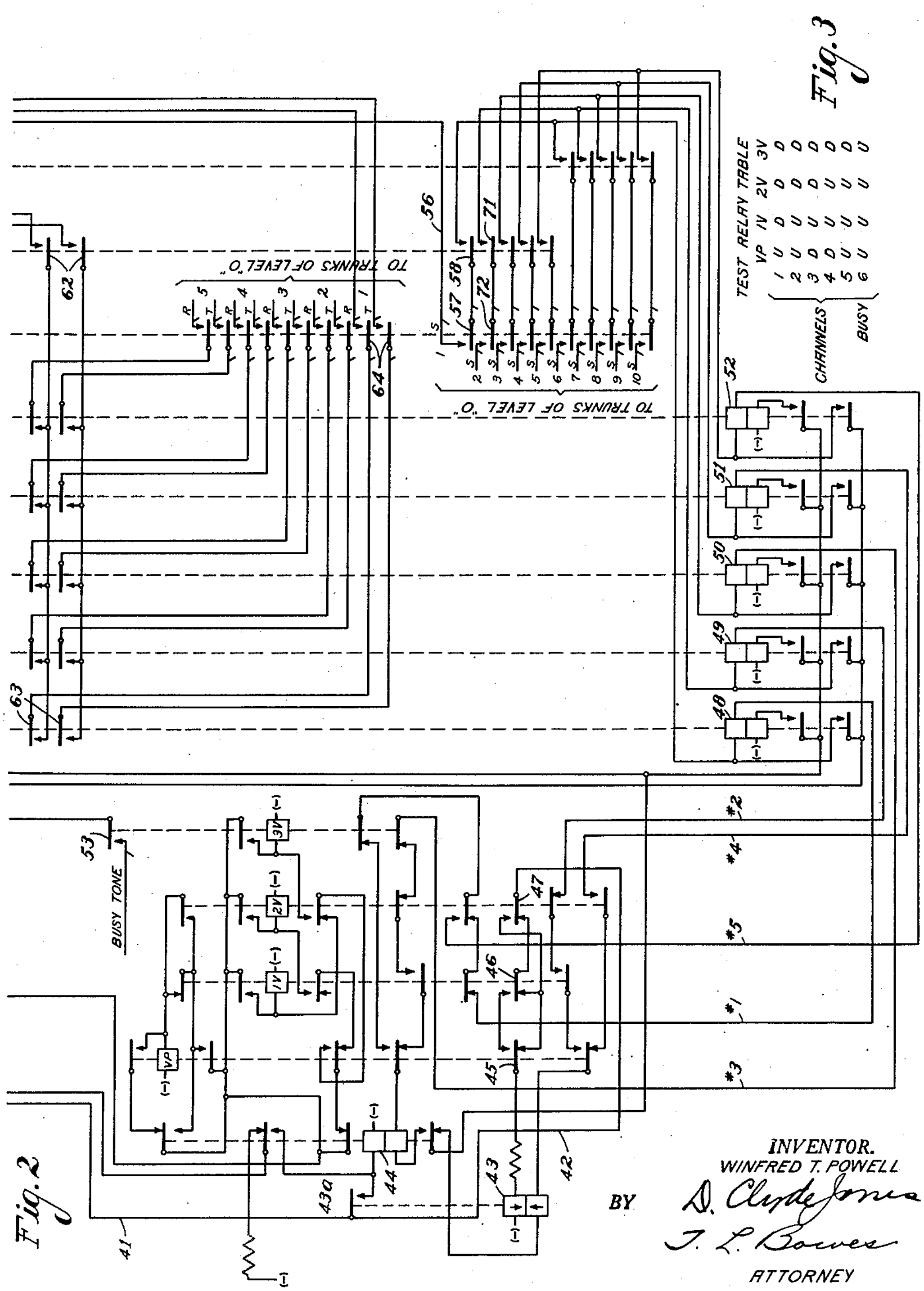

The various features and advantages of the invention will appear from the detailed description and claims when taken with the drawings in which:

Figs. 1 and 2, when arranged vertically, disclose a selector of the relay type for effecting straight forward trunk or link hunting and Fig. 3 shows a test or code relay table indicating the various operating combinations of said relays to select the various trunks and links.

It is believed that the invention will best be understood by describing the operation of the selector circuit arrangement of the present invention. When the subscriber at substation A originates a call, a finder switch LF extends the tip and ring conductors 5 and 6 of the calling or incoming line respectively to the conductors 7 and 8 of the selector which is connected to the line finders. When the calling line is thus extended, it completes a circuit from positive and negative poles of battery respectively through the upper and lower windings in series of the impulse relay 9. The impulse relay is energized in this circuit and completes a circuit for operating the slow-release relay 10 which circuit extends through the upper front contact of relay 9, back contact and armature of the relay 11, to the positive pole of battery, it being understood that the positive pole is grounded. The relay 10, when energized, connects the positive pole of battery through its armature 10*b* and front contact, to allotter wire 13, for making this link busy, for holding the line finder and for operating the cut-off relay (not shown) of the calling line. Relay 10 at its armature 10*c* connects the positive pole of battery to the locking conductor 15. The application of positive potential to the locking conductor 15 closes an operating circuit for the counting relay C1. This circuit may be traced from the negative pole of battery, winding of the relay C1, back contact and armature of relay C2, front contact and armature 16 of impulse relay 9, conductor 17, break contacts and continuity springs 18*a* and 19*a* of relays 18 and 19 to ground on locking conductor 15. Relay 10, at its contacts 10*d* and 10*e*, closes break points in certain holding circuits including the master ground conductor, ground being connected to this conductor at contact 10*e* as long as relay 10 of the selector is operated.

The selector is now in readiness to receive impulses transmitted over the calling line from substation A. It will be assumed that 10 impulses are transmitted from substation A for selecting the tenth group of outgoing lines or trunks extending from the illustrated selector. These 10 impulses operate the hundreds connecting or group relay 20 associated with the tenth group of outgoing lines over a circuit to be later described. The release of the impulse relay 9, in response to the beginning of the first impulse of the series, closes a circuit for operating change over relay 21 extending from ground, break contact of relay 11, break contact of relay 9, make contact of relay 10 and winding of relay 21 to the negative pole of battery and since relay 21 is slow to release it will remain operated until the end of the impulse series, at which time it will release. The release of impulse relay 9 also closes an operating circuit for counting relay C2 and a locking circuit for counting relay C1. The operating circuit for relay C2 may be traced from the negative pole of the battery, winding of relay C2, break contact of relay 9, make contact 22 of relay C1 to the positive pole of the battery over conductor 17, and through the break contacts and continuity springs 18*a* and 19*a* to holding conductor 15. The locking circuit for relay C1 may be traced from the negative pole of battery, winding and make contact 24 of relay C1, break contact 16 of relay 9 and thence to positive battery on holding conductor 15 over the circuit previously described. Relay C1 is released at the end of the first impulse, when impulse relay 9 operates and opens its contact 16, thereby interrupting the previously described locking circuit for relay C1. Relay C2 is prevented from releasing at this time by means of a locking circuit extending from the positive pole of the battery on conductor 17, make contact 16 of relay 9, make contact and winding of relay C2 to the negative pole of battery. Relay C2 is released at the beginning of the second impulse because the above described locking circuit is opened at the make contact 16 of relay 9.

Relay C1 is again operated at the end of the second impulse over a circuit which may be traced from positive battery on conductor 17, make contact 16 of relay 9, break contact of relay C2 and winding of relay C1 to negative battery. At the beginning of the third impulse, relay C2 is operated and relay C1 is locked operated over the circuits previously described in connection with the beginning of the prior odd impulse, i. e., impulse #1. At the end of the third impulse, relay C1 is released in the same manner that it was released at the end of the first impulse. At the beginning of the fourth impulse, relay C2 is released in the same manner that it was released at the beginning of the second impulse. Consequently, relays C1 and C2 continue to operate in this manner, relay C1 being operated at the end of each even impulse and being released at the end of each odd impulse, while relay C2 is operated at the beginning of each odd impulse and released at the beginning of each even impulse, it being understood that the beginning and the end of an impulse, above discussed, refers to the release and the operation respectively of impulse relay 9. Relays C3 and C4 are operated and released in response to the operation and release of relay C2 in a manner analogous to the operation and release of relays C1 and C2, in response to the operation and release of the impulse relay 9. In other words, the relay C3 is operated at each odd operation of the relay C2 and is released at each even operation of relay C2, while relay C4 is operated at each odd release of relay C2 and is released at each even release of the relay C2. In this manner relays C1 and C2 count each pair of impulses, while relays C3 and C4 count each group of four impulses. When the relay C4 is operated, a circuit is closed for operating the relay 25 from the negative pole of battery, winding of this relay, back contact and armature of the switching relay 26, front contact and armature of the relay C4, front contact and armature of relay C3 and thence over the lead 17, to ground on the holding conductor 15. Relay 25 on operating, closes a first locking circuit for itself from the negative pole of battery, its winding, front contact and armature, conductor 28, back contact and armature of switching relay 26 and thence to the holding conductor 15 over the lead 17. This first locking circuit for the relay 25 is maintained until the switching relay 26 is operated. Since the relay C3 operates the second time before the switching relay 26 operates, a second locking circuit is closed through the front contact and armature 29 of relay C3 by way of conductor 17, for holding the relay 25 operated until the release of the relay C3, which takes place after the switching relay 26 has operated.

The switching relay 26 is operated during the fifth impulse period of relay 9, that is, when the relay C3 is operated for the second time, its operating circuit being traced from negative battery, winding of relay 26, make contact of relay 25, break contact of relay C4 and make contact of relay C3 to ground on conductor 17. When the switching relay 26 is operated, it is locked in this condition through its lower front contact and armature and through the conductor 17, to the holding conductor 15.

By this arrangement, ten channel circuits can be selected in accordance with any series of impulses from one to ten. These channel circuits are designated 1, 2—0, and extend to group relays similar to 20, there being such a group relay individual to each group of outgoing lines, only the 0 channel circuits being shown. It will be understood that an execution circuit is closed to the selected relay 20 when the change over relay 21 releases to indicate the end of the series of impulses. For example, the release of change over relay 21 completes an executing circuit including conductor 32 for operating the selected group relay, such as relay 20 when the 0 group is selected by 10 impulses or other group relays connected to the other circuits 1—9, selected in various combinations of the counting relays C1—C4 and the switching relays 25 and 26, by means of contacts of these relays which may be readily traced.

It was assumed that ten impulses were transmitted before the change-over relay 21 released. Consequently, the relay C1 will be operated, the relay C2 will be released, relays C3 and C4 will be operated, while the relay 25 will be released and the switching relay 26 will be operated. With the mentioned relays in the condition set forth, the relay 20 corresponding to the 0 channel circuit, has a circuit completed from the negative pole of battery, winding of this relay, front contact and armature 30 of relay C4, back contact and armature of relay 25, front contact and armature of relay 26, front contact and armature 31 of relay C3, over the execution conductor 32, back contact and armature of the change over relay 21, front contact and armature of the impulse relay 9, to the positive pole of battery over the holding conductor 15.

Let it be assumed that the first five trunks of the selected group are busy. As a result of this condition, the slow-releasing relays such as 33*a*, 33*b*, 33*c*, 33*d* and 33*e* of the first five trunks (each of which is a relay similar to relay 10 and operated when the associated trunk is busy) will be operated to complete a chain circuit through their front contacts and the front contact of relay 20 for operating the secondary subgroup relay 18 which is common or individual to the secondary subgroup of lines represented by trunks 6 to 10 inclusive. The circuit for the relay 18 extends from the negative pole of battery, winding of this relay, its continuity spring and back contact, armature 34 and back contact of the primary subgroup relay 19, conductor 35, upper armature and front contact of relay 20, conductor 36, front contact and armature 37 of relay 33*a* and thence through the front contacts and armatures of the relays 33*b*, 33*c*, 33*d* and 33*e* to the positive pole of battery. When the relay 18 operates, it interrupts, at its armature 38 and back contact, the operating circuit of the relay 19 which is common or individual to the primary subgroup of lines representing trunks 1 to 5 inclusive. The operation of the relay 18, by opening the circuit of the relay 19 which is common to the first five trunks of the group, prevents the operation of this relay in the event that any one of these first five trunks becomes idle after the relay 18 has been operated. A similar interlock is provided for the relay 18 which is common to the last five trunks of the gorup. This interlock prevents the false operation of the relay 18 if one of these trunks becomes idle during the operation of the subgroup relay 19, since the operating circuit of the subgroup relay 18 is interrupted at this time at the armature 34 and back contact of the subgroup relay 19. When either of the subgroup relays 18 or 19 is operated, it is locked in this condition. For example, the relay 18 is locked operated from the negative pole of battery, winding of this relay, its armature and continuity spring 18*a*, back contact and continuity spring 19*a* and thence to the positive pole of battery over the holding conductor 15. In the event that the subgroup relay 19 had been operated instead of relay 18, the locking circuit for the relay 19 would have extended through the armature and continuity spring 19a to the holding conductor 15. At this time the relay 20 is also locked in a circuit from the negative pole of battery, winding of this relay front contact and armature 20a, armature 18b and continuity contact, thence through the armature and continuity spring 18a and through the back contact and continuity spring 19a, to the holding conductor 15. The relays 18 and 20 are thus locked operated. The positive pole of battery on contact 18b of relay 18 is extended through conductor 40, armature and back contact of the relay 11, conductors 41 and 42, back contacts and armatures 47, 46, 45 of relays 2V, 1V and VP, through the resistor and upper winding of the pulse generating relay 43 to the negative pole of battery. This operates pulse generating relay 43 which extends ground by way of the circuit just described from the conductor 41 through the armature 43a and its front contact, upper winding of the pulse repeating relay 44 to the negative pole of battery. The pulse repeating relay 44 is thus operated.

The pulse repeating relay 44 controls the V and VP relay circuits which govern the trunk hunting. This is effective since the pulse repeating relay 44 at its odd operation operates the code relay VP and at its even operation releases the relay VP, i. e., relay VP follows the operations (not the releases) of relay 44, relay VP being operated at each odd (1, 3, 5, etc.) operation of relay 44 and released at each even (2, 4, 6, etc.) operation of relay 44. Furthermore, relay 1V is operated at the first release of relay 44. Relay 2V is operated at the second release of relay 44 and relay 3V is operated at the third release of relay 44. These relays, on operation, close locking circuits which maintain them in operated condition until the connection is extended through to the next trunk line. It will be observed that the upper winding of the pulse relay 43 is opened at the armature 45 on the operation of the relay VP. However, the circuit for the upper winding of relay 43 is again closed when the relay 1V attracts its armature 46. When the relay VP releases, it opens the circuit for the relay 43 at the armature 45 and its front contact. The operating circuit for the pulse relay 43 is then closed at the armature 47 and front contact of relay 2V when this last-named relay is operated. This last described circuit for the relay 43 is opened when the relay VP next operates. In this manner, the pulse relay 43, the relay VP and the relays 1V, 2V and 3V interact to provide a self-pulsing circuit for effecting the sequential selections during which the trunks of the selected group are tested for busy or idle condition of the outgoing line. The relays VP, 1V, 2V and 3V selectively control circuits including the five conductors designated #1, #2, #3, #4 and #5. It will be noted that the #1 conductor is closed when only the relay VP is operated, conductor #1 then being extended through the back contacts and armatures of relays 1V, 2V and 3V, armature and front contact of relay VP to the lower winding of the pulse repeating relay 44. Similarly, channel #2 is closed only during the time that the relays 1V and VP are operated but with relay 2V not operated. Conductor #3 is closed with relay VP released and with relay 1V operated and with relays 2V and 3V released, conductor #4 is closed with relay 2V operated and with relay VP released. Conductor #5 is closed with relays 2V and VP operated but with relay 3V released.

Since it was assumed that the subgroup relay 18 was operated, the five conductors #1—#5 are extended through the five connecting relays 48—52 to test the corresponding trunks 6—10. In the event that the subgroup relay 19 is operated, instead of subgroup relay 18, then these five conductors #1—#5 are extended through the same connecting relays to test the first five trunks of the group 1—5. If all of the trunks of the selected group are busy, the trunk hunting relays, including relays VP, 1V, 2V and 3V will continue to operate in response to the continued operation of the pulse generating relay 43 and the pulse repeating relay 44 until relay 3V is operated and locked. Since relay 3V does not close the circuit for again operating relay 43, the pulse generating operation is stopped and relay 3V, at its contact 53, applies a busy tone over conductor 54 and through the busy tone condenser and the uppermost break contact of relay 11 to the calling line.

A detailed description of the operation of trunk hunting relays VP, 1V, 2V and 3V will now be given, it being understood that these relays operate to select any one of the first five trunks in the primary subgroup or the first five trunks in the secondary subgroup, as determined by the relay 19 or relay 18 respectively, whichever is operated. This is done by selectively and sequentially testing by way of conductors #1—#5 until an idle trunk is found or until all trunks are found busy. With the intermittent operations of pulse generating relay 43 and pulse repeating relay 44 taking place, the first operation of relay 44 which marks the beginning of the first impulse closes a circuit for operating relay VP which may be traced from ground, contact 10d of relay 10, uppermost make contact of relay 44, break contact of relay 1V and winding of relay VP to negative battery. Relay VP closes a first locking circuit for itself extending from ground at contact 10d, lower inner make contact of relay VP, break contact of relay 1V and winding of relay 1V to negative battery. When relay 44 is released to mark the end of the first impulse a second locking circuit is closed for relay VP which may be traced from ground at contact 10d, uppermost break contact of relay 44, make contact and winding of relay VP to negative battery. At this same time a circuit is closed for operating relay 1V which may be traced from this same ground, upper inner break contact of relay 44, make contact of relay VP, break contact of relay 2V and winding of relay 1V to negative battery. Relay 1V opens up the above described first locking circuit for relay VP, this latter relay now being energized by way of its above described second locking circuit. Relay 1V closes a locking circuit for itself extending from ground at contact 10d, make contact and winding of relay 1V to negative battery.

When relay 44 operates to mark the beginning of the second impulse, the above described second locking circuit for relay VP is opened for effecting the release of this relay. When relay 44 releases to mark the end of the second impulse, a circuit is closed for operating relay 2V extending from ground at contact 10d, break contact of relay 44, break contact of relay VP, make contact of relay 1V and winding of relay 2V to negative battery. Relay 2V is locked operated to the same grounded conductor that locks relay 1V. When relay 44 operates to mark the beginning of the third impulse, relay VP is again operated over the previously described operating circuit which now extends through the uppermost make contact of relay 2V instead of the uppermost break contact of relay 1V. The above described first locking circuit for relay VP is now completed by way of this uppermost make contact of relay 2V. When relay 44 releases to mark the end of the third impulse, the above described second locking circuit is closed for holding relay VP operated and an operating circuit is closed for relay 3V which may be traced from ground at contact 10*d*, break contact of relay 44, make contact of relay VP, make contact of relay 2V and winding of relay 3V to negative battery. Relay 3V is locked to the same conductor which locks relays 1V and 2V.

In order to explain how an odd idle trunk is selected, let it be assumed that the trunk #1 is idle. The relay 20, as well as the relay 19 which is common to the trunks 1 to 5 inclusive, is operated and then locked in this condition. Relay 19 is operated because, when any one of the first five trunks is idle, a circuit is completed from ground, break contact of one of the #33 relays, make contact of relay 20, break contact 38 of relay 18, break contact and winding of relay 19 to negative battery. The pulse generating relay 43 is operated as already described to operate the pulse repeating relay 44. The action of these relays operates relay VP to test trunk #1. Since it has been assumed that this trunk is idle, a circuit to battery through the back contact and armature 55 (Fig. 1) of relay 33*a* of this trunk, extends over conductor 56, front contact and armature 57 of relay 20, armature 58 and front contact of the group relay 19, upper winding of the units connecting relay 48, the #1 conductor, back contacts and armatures of relays 1V, 2V and 3V, front contact and armature of relay VP, lower winding of the pulse repeating relay 44, the lower front contact and armature of this relay, to ground through contact and armature 10*e* of relay 10. Pulse repeating relay 44 is locked operated for terminating the stepping of the relays VP, 1V, 2V and 3V which in turn stops the trunk hunting. The connecting relay 48 is operated in the testing circuit just described and closes a locking circuit for itself by way of its lower winding to the master ground. The relay 48, at its armature 60 and front contact, extends the master ground lead through conductor 61, winding of the link cut-off relay 11, armature and front contact of relay 44 and thence in series with the upper winding of relay 44 to battery. This circuit holds the pulse repeating relay 44 operated, while the operation of relay 11 short-circuits the upper winding of the relay 48 for applying ground to the sleeve of the selected trunk thereby immediately making this trunk busy. When the units connecting relay 48 is operated and with the relay 20 operated, the calling line conductors 7 and 8 are extended through the front contacts and armatures 62 of relay 19, front contacts and armatures 63 of relay 48, front contacts and armatures 64 of relay 20, armatures and back contacts of relay 65 of the selected trunk through both windings in series of the impulse relay 66 of this trunk, to ground and grounded battery respectively. The slow-releasing relay 33*a* associated with this trunk is then operated through the front contact and armature of relay 66 and the back contact and armature of the relay 65. The operation of the link cut-off relay 11 opens the operating circuit of the impulse relay 9 of the selector under consideration. The release of the impulse relay 9 effects the release of the slow-releasing relay 10 of this selector. Since the relay 33*a* of the selected trunk is operated before the slow-releasing relay 10 of the selector is released, the sleeve conductor 56 is shifted from battery to ground. This ground is extended back through the lower front contact 68 of the link cut-off relay 11 to the master ground conductor for locking relay 48, the link cut-off relay 11 and the pulse repeating relay 44. This ground is also extended back over the sleeve conductor 73, of the calling circuit. Other idle trunks can be selected, depending on which one of the relays 48 to 52 inclusive, is operated.

An even trunk such as trunk #2 is selected in the following manner. The relays 20 and 19 and the pulsing relay 43, as well as the pulse repeating relay 44 and the VP relay are operated as set forth previously. With these relays operated, the test of the trunk #1 is effected but since this trunk is assumed to be busy, ground on its sleeve conductor short-circuits the upper winding of the relay 48 as well as the lower winding of the pulse repeating relay 44 which prevents the energization of these two relays. Consequently, the pulse repeating relay is not energized by way of its lower winding at this time so that when the pulse relay 43 releases, the pulse repeating relay 44 is released. The release of the relay 44 effects the operation of relay 1V at which time trunk #2 is tested. Since this trunk is idle, a circuit is completed from the lower winding of relay 43 extending from ground on the master ground conductor, back contact and armature of relay 44, lower winding of relay 43, front contacts and armatures of relays VP and 1V, back contact and armature of relay 2V, conductor #2, upper winding of relay 49, front contacts and armatures 71, 72 of relays 19, 20, back contact and armature of the relay 33*b* of this trunk and the resistance (not shown), to battery.

The circuit last described energizes the lower winding of the relay 43. However, at this time the upper winding of relay 43 is energized in the opposite direction over a circuit extending from the grounded conductor 15, continuity springs 19*a* and 19*b* and their armatures of relay 19, conductor 40, armature and back contact of relay 11, conductors 41 and 42, armature 47 and back contact of relay 2V, armature 46 and front contact of relay 1V, front contact and armature 45 of relay VP, resistance and upper winding of relay 43, to battery. The relay 43 is differentially connected and, therefore, does not operate under the circuit conditions just described. Relay 49 is operated in the above-described circuit and closes a locking circuit for itself through its lower winding, its front contact and armature to the master ground conductor. The link cut-off relay 11 is now energized in the manner previously described over a circuit traceable from the master ground, armature 70 of relay 49, conductor 61, winding of relay 11, armature and back contact of relay 44 and resistance to battery. The operation of the relay 11 short-circuits the upper winding of the relay 49 for applying ground to the sleeve conductor of the selected trunk in order to make this trunk busy. The operation of the link cut-off relay 11 effects the release of the impulse relay 9 and the slow-releasing relay 10 of the selector in use. The operation of the relay 49 extends the calling line to both windings in series of an impulse relay similar to 66 associated with the #2 trunk. This operated relay in turn energizes the slow-releasing relay 33*b* of the selected trunk in the manner previously described. The pulse relay 43 is prevented from operating because the link cut-off relay 11 opens the circuit of the upper winding of the relay 43 at the same time that the relay 11 short-circuits the lower winding of the relay 43. It will be understood that since the pulse relay 43 is prevented from operating, the operation of the pulse repeating relay is prevented and the hunting relays VP, 1V and 2V are prevented from taking a further step.

The short-circuiting of the lower winding of the pulse relay 43 is delayed until the link cut-off relay 11 operates and extends the master ground conductor by way of its lower front contact and armature 68, lowermost armature and front contact of the relay 49 to the right hand terminal of the lower winding of the relay 43 by way of the upper winding of the connecting relay 49.

The above examples indicate how the trunk hunting operation of the V relays continues until the busy relay 3V is operated when all trunks are busy. These examples also indicate how the pulse repeating relay 44 is locked operated for the purpose of terminating the stepping or hunting when an idle odd trunk is selected. These examples also illustrate how the pulse relay 43 is maintained in its non-operated position for terminating the stepping or hunting operation when an even trunk is selected. It should be mentioned that when an even trunk is selected, this trunk is made busy immediately when the connecting relay associated therewith is operated and further that the holding ground is extended back to the master ground conductor for holding the selector from the ground applied to the sleeve of the selected trunk by the operation of its relay, such as 33*b*, 33*c*, or 33*d*. When an odd trunk is selected the VP relay is released when its holding circuit through its lower armature and front contact is interrupted at the armature 10*d* of relay 10. At this time, the holding circuit for the relay VP through its upper armature and front contact is now opened because the pulse repeating relay 44 is maintained in its operated position. When an even trunk is selected, such as, trunk #2, the VP or other operated relays are released since their locking circuits are interrupted at the armature 10*d* of the slow releasing relay when this last named relay releases. Referring back to that point in the operation of the selector, when either the relay 18 or 19 is operated, the conductor 17 is opened either at the back contact and continuity spring 18*a* or the back contact and continuity spring 19*a* of the relays 18 or 19, depending on which one of these relays was operated. The interruption of the circuit, including the conductor 17, effects the release of any of the counting relays that remained operated at the termination of the dial impulse. The release of these counting relays can take place at that time since a relay 20 individual to the trunk group has already been operated and locked.

The above examples also show that group relays, such as relay 20, are responsive to selective control, such as dial impulses, for operating the group relay of the selected group. Moreover, control means is provided responsive to operation of the group relay and the presence of an idle outgoing line in the primary subgroup (trunks 1 to 5) for operating the primary subgroup relay 19, the control means comprising a circuit including contacts of at least one relay 33*a*, 33*b*, 33*c*, 33*d*, or 33*e*. If all primary trunks are busy and relay 20 is energized, the control circuit operates relay 18. Then, as heretofore explained, the connecting relays automatically select an idle outgoing line in the subgroup of the selected group. Thereafter, the group relay and the subgroup relay of the selected group as well as one of the connecting relays cooperate to extend the incoming line to an idle line in the selected group.

What I claim is:

1. In an automatic telephone system, an incoming line, groups of outgoing lines, a group relay individual to each group of outgoing lines, each group of outgoing lines being further divided into a primary subgroup and a secondary subgroup, a subgroup relay individual to each subgroup of lines, connecting relays common to said outgoing lines, the number of connecting relays being less than the number of outgoing lines in any group, means for testing the busy or idle condition of the outgoing lines, means responsive to selective control over said incoming line for operating the group relay of a selected group, control means responsive to the operation of the group relay of the selected group and to the presence of an idle outgoing line in the primary subgroup of said last-mentioned group for operating the primary subgroup relay thereof, said control means being responsive to the operation of the group relay of the selected group and to the busy condition of all of the primary subgroup outgoing lines of the selected group for operating the secondary subgroup relay of the selected group, means including said connecting relays for automatically selecting an idle outgoing line in the subgroup of the selected group, and means comprising the group relay and a subgroup relay of the selected group as well as one of said connecting relays for extending said incoming line to an idle outgoing line in the selected group.

2. In an automatic telephone system, an incoming line, groups of outgoing lines, a group relay individual to each group of outgoing lines, each group of outgoing lines being further divided into a primary subgroup and a secondary subgroup, a subgroup relay individual to each subgroup of lines, a group of connecting relays, each of said connecting relays being individual to a different outgoing line in each of said primary subgroups and also in each of said secondary subgroups, means for testing the busy or idle condition of the outgoing lines, means responsive to selective control over said incoming line for operating the group relay of a selected group, control means responsive to the operation of the group relay of the selected group and to the presence of an idle outgoing line in the primary subgroup of said last-mentioned group for operating the primary subgroup relay thereof, said control means being responsive to the operation of the group relay of the selected group and to the busy condition of all of the primary subgroup outgoing lines of the selected group for operating the secondary subgroup relay of the selected group, means including said connecting relays for automatically selecting an idle outgoing line in the subgroup of the selected group, and means comprising the group relay and a subgroup relay of the selected group as well as one of said connecting relays for extending said incoming line to an idle line in the selected group.

3. In an automatic telephone system, an incoming line, groups of outgoing lines, a group relay individual to each group of outgoing lines, each group of outgoing lines being further divided into a primary subgroup and a secondary subgroup, a subgroup relay individual to each subgroup of lines, a group of connecting relays common to said outgoing lines, the number of connecting relays being less than the number of outgoing lines in any group, means for testing the busy or idle condition of the outgoing lines, means responsive to selective control over said incoming line for operating the group relay of a selected group, control means responsive to the operation of the group relay of the selected group and to the presence of an idle outgoing line in the primary subgroup of said last-mentioned group for operating the primary subgroup relay thereof, said control means being responsive to the operation of the group relay of the selected group and to the busy condition of all of the primary subgroup outgoing lines of the selected group for operating the secondary subgroup relay of the selected group, a pair of alternately operating pulsing relays, the operation of which is initiated by the operation of a group relay, operating circuits for said connecting relays having break points therein, means jointly controlled by said pulsing relays for closing break points in the operating circuits of said connecting relays in succession until the circuit of the connecting relay related to an idle outgoing line in the selected group and the selected subgroup thereof is completed responsive to the indicated idle condition of said last-mentioned trunk, and means comprising said selected group relay, a subgroup relay as well as said last-mentioned connecting relay for extending said incoming line to the selected outgoing line.

4. In an automatic telephone system, an incoming line, groups of outgoing lines, a group relay individual to each group of outgoing lines, each group of outgoing lines being further divided into a primary subgroup and a secondary subgroup, a subgroup relay individual to each subgroup of lines, a group of connecting relays common to said outgoing lines, the number of connecting relays being less than the number of outgoing lines in any group, means for testing the busy or idle condition of the outgoing lines, means responsive to selective control over said incoming line for operating the group relay of a selected group, control means responsive to the operation of the group relay of the selected group and to the presence of an idle outgoing line in the primary subgroup of said last-mentioned group for operating the primary subgroup relay thereof, said control means being responsive to the operation of the group relay of the selected group and to the busy condition of all of the primary subgroup outgoing lines of the selected group for operating the secondary subgroup relay of the selected group, a plurality of code relays operable in various combinations in response to pulses, means including said code relays for generating said pulses, operating circuits for said connecting relays, said operating circuits having break points therein, means including said code relays for closing said break points in the operating circuits for said connecting relays, one circuit at a time, until the operating circuit of the connecting relay related to an idle outgoing line in the selected group and the selected subgroup thereof is completed responsive to the indicated idle condition of said last-mentioned trunk, and means comprising said selected group relay, a subgroup relay as well as said last-mentioned connecting relay for extending said incoming line to the selected outgoing line.

5. In an automatic telephone system, an incoming line, groups of outgoing lines, a group relay individual to each group of outgoing lines, each group of outgoing lines being further divided into a primary subgroup and a secondary subgroup, a subgroup relay individual to each subgroup of lines, a series of connecting relays common to said outgoing lines, the number of connecting relays being less than the number of outgoing lines in any group, means for testing the busy or idle condition of the outgoing lines, means responsive to selective control over said incoming line for operating the group relay of a selected group, control means responsive to the operation of the group relay of the selected group and to the presence of an idle outgoing line in the primary subgroup of said last-mentioned group for operating the primary subgroup relay thereof, said control means being responsive to the operation of the group relay of the selected group and to the busy condition of all of the primary subgroup outgoing lines of the selected group for operating the secondary subgroup relay of the selected group, a plurality of code relays operable in various combinations in response to pulses, means including said code relays for generating said pulses operating circuits for said connecting relays, said operating circuits having break points therein, means including said code relays for closing said break points in the operating circuits for said connecting relays, in succession, until the operating circuit of the connecting relay related to an idle outgoing line in the selected group and the selected subgroup thereof is completed responsive to the indicated idle condition of said last-mentioned trunk, and means comprising said selected group relay, a subgroup relay as well as said last-mentioned connecting relay for extending said incoming line to the selected outgoing line.

6. In a relay type selector, an incoming circuit and a plurality of outgoing trunk lines in said selector, means for characterizing said outgoing trunk lines as busy or idle, a series of trunk hunting relays in said selector, an impulse generating relay in said selector, switching means in said selector for connecting said incoming circuit to any idle one of said outgoing trunk lines, means for intermittently operating said impulse generating relay, means controlled by the intermittent operation of said impulse generating relay for operating said trunk hunting relays in various combinations, means including said trunk hunting relays when operated in said combinations for effecting a testing operation by selectively and sequentially testing said outgoing trunk lines, and means responsive to the finding of an idle trunk line in said series by said testing operation for causing said switching means to connect said incoming circuit to the selected idle outgoing trunk line.

7. In a relay type selector, an incoming circuit and a plurality of outgoing trunk lines in said selector, means for characterizing said outgoing trunk lines as busy or idle, a series of trunk hunting relays in said selector, an impulse generating relay in said selector, switching means in said selector for connecting said incoming circuit to any idle one of said outgoing trunk lines, means for intermittently operating said impulse generating relay, means controlled by the intermittent operation of said impulse generating relay for operating said trunk hunting relays in various combinations, means including said trunk hunting relays when operated in said combinations for effecting a testing operation by selectively and sequentially testing said outgoing trunk lines, means responsive to the finding of an idle trunk line in said series by said testing operation for causing said switching means to connect said incoming circuit to the selected idle outgoing trunk line, and means including one of said trunk hunting relays for applying a busy signal to said incoming circuit when said testing operation finds all of said outgoing trunk lines busy.

8. In a relay type selector, an incoming circuit and a plurality of outgoing trunk lines in said selector, means for characterizing said outgoing trunk lines as busy or idle, a series of trunk hunting relays in said selector, an impulse generating relay in said selector, switching means in said selector for connecting said incoming circuit to any idle one of said outgoing trunk lines, means for intermittently operating said impulse generating relay, means controlled by the intermittent operation of said impulse generating relay for operating said trunk hunting relays in various combinations, means including said trunk hunting relays when operated in said combinations for effecting a testing operation by selectively and sequentially testing said outgoing trunk lines, means responsive to the finding of an idle trunk line in said series by said testing operation for causing said switching means to connect said incoming circuit to the selected idle outgoing trunk line, and means responsive to the finding of said idle trunk line for stopping the intermittent operation of said impulse generating relay.

9. In a relay type selector, an incoming circuit and a plurality of outgoing trunk lines in said selector, means for characterizing said outgoing trunk lines as busy or idle, a series of trunk hunting relays in said selector, an impulse generating relay in said selector, switching means in said selector for connecting said incoming circuit to any idle one of said outgoing trunk lines, means for intermittently operating said impulse generating relay, means controlled by the intermittent operation of said impulse generating relay for operating said trunk hunting relays in various combinations, means including said trunk hunting relays when operated in said combinations for effecting a testing operation by selectively and sequentially testing said outgoing trunk lines, means responsive to the finding of an idle trunk line in said series by said testing operation for causing said switching means to connect said incoming circuit to the selected idle outgoing trunk line, and means responsive to the finding of all of said trunk lines busy for stopping the intermittent operation of said impulse generating relay.

WINFRED T. POWELL.

REFERENCES CITED

The following references are of record in the file of this patent:

UNITED STATES PATENTS

| Number | Name | Date |
|---|---|---|
| 1,520,909 | Powell | Dec. 30, 1924 |
| 1,681,034 | Gardner | Aug. 14, 1928 |
| 1,685,410 | Stehlik | Sept. 25, 1928 |